United States Patent [19]

Wilson et al.

[11] Patent Number: 5,105,902

[45] Date of Patent: Apr. 21, 1992

[54] TRANSFER CASE SHIFT-ON-FLY SYSTEM

[75] Inventors: Robert J. Wilson, Warners; Randolph C. Williams, Weedsport, both of N.Y.

[73] Assignee: New Venture Gear, Inc., Troy, Mich.

[21] Appl. No.: 624,392

[22] Filed: Dec. 7, 1990

[51] Int. Cl.[5] .............................................. B60K 23/08
[52] U.S. Cl. ................................... 180/247; 180/249; 180/250
[58] Field of Search ............... 180/233, 247, 248, 249, 180/250

[56] References Cited

U.S. PATENT DOCUMENTS

| | | | |
|---|---|---|---|
| 2,913,929 | 11/1959 | Anderson | 180/247 |
| 4,341,281 | 7/1982 | Nagy | 180/247 |
| 4,381,828 | 5/1983 | Lunn et al. | 180/247 |
| 4,677,873 | 7/1987 | Eastman et al. | 180/250 |
| 4,770,280 | 9/1988 | Frost | 180/247 |
| 5,033,575 | 7/1991 | Takeshita et al. | 180/249 |

Primary Examiner—Mitchell J. Hill
Attorney, Agent, or Firm—Harness, Dickey & Pierce

[57] ABSTRACT

The present invention provides a motor vehicle cold shift assist system for selectively actuating an axle connecting mechanism to automatically connect the non-driven wheels to its associated axle drive mechanism immediately following synchronization for counteracting the inertial loading acting on the transfer case synchronizer clutch mechanism. The axle connecting mechanism is actuated prior to the transfer case being locked in the four-wheel drive mode. As such, the present invention substantially reduces the shift resistance and gear clash encountered upon the vehicle operator shifting into the four-wheel drive mode during cold weather conditions.

13 Claims, 3 Drawing Sheets

TRANSFER CASE SHIFT-ON-FLY SYSTEM

BACKGROUND OF THE INVENTION

The present invention relates to a shift arrangement for motor vehicle transmissions and, more particularly, to such an arrangement for reducing operator shift effort when shifting from a two-wheel drive mode to a four-wheel drive mode under cold weather conditions.

In general, power transfer mechanisms are used in association with both manual and automatic transmissions for selectively directing power to the wheels of a motor vehicle upon shifting from the two-wheel drive mode to the four-wheel drive mode. It is known to use a gear synchronizer clutch arrangement in part-time transfer cases to provide "shift-on-the-fly" two-wheel drive to four-wheel drive "mode" shifting. One example of such an arrangement is shown and described in U.S. Pat. No. 4,770,280 issued Sept. 13, 1988 to Frost which discloses a part-time transfer case having a gear synchronizer clutch unit incorporated as part of its "mode" shifting mechanism. Following speed synchronization, a fork mechanism shifts the synchronizer clutch sleeve into engagement with the external splines of a silent chain carrier for locking the transfer case in its four-wheel drive mode thereby delivering power via the drive chain to the vehicle's front output shaft.

In part-time four-wheel drive systems, various axle disconnect systems have been used for enabling the non-driven wheel(s) to rotate free of the remainder of its associated axle final drive assembly when the vehicle is operating in the two-wheel drive mode. Conventionally, "shift-on-the-fly" part-time transfer cases utilize automatic locking hubs having manual, electrical or fluid (i.e. vacuum) actuated front axle disconnect systems. These "automatic" systems selectively connect the front wheels to its associated front drive mechanism for transferring drive torque from the transfer case to the front wheels. Typically, these systems are actuated to couple the front drive components in response to a signal indicating that the vehicle operator has shifted into the four-wheel drive mode.

Prior U.S. patents disclose various means for enabling the non-driven wheel(s) to rotate free of the remainder of the front drive mechanism when in two-wheel drive mode. For example, U.S. Pat. No. 2,913,929 (Anderson) discloses a front axle design having complementary mechanism for cooperatively disconnecting both of the front wheels from the drive train to permit two-wheel drive operation. These complimentary mechanisms are actuated in common by a movable lever in the passenger compartment of the vehicle. The movable lever is connected to complementary clutch collars which are shiftable between two-wheel drive and four-wheel drive positions on the right and left axle shafts. Likewise, U.S. Pat. No. 2,770,150 (Culverwell) discloses a front axle design for a four-wheel drive vehicle which includes a mechanism for simultaneously disconnecting the right and left axle shafts from the center differential. In this type of system, disconnection of the front wheels takes place by shifting complementary clutch collars located within the front differential housing. Finally, reference may be had to U.S. Pat. No. 4,381,828 issued May 3, 1983 (Lunn et al) for details of a vacuum actuated axle disconnect system.

In conventional part-time four wheel drive systems, once synchronization of the front and rear drive assemblies is completed, the synchronizer clutch sleeve is moved into engagement with the chain carrier external splines. Upon complete "lock-up" therebetween, a vacuum switch signals the axle disconnect system to move a clutch collar for locking the front wheels to the front drive mechanism.

A common problem associated with part-time four-wheel drive transfer cases is that, during cold weather conditions, the vehicle operator must physically overcome excessive shift resistance and noise, commonly referred to as "clash", when attempting to shift into the four-wheel drive mode. The increased shift effort is due primarily to the high viscosity of the cold axle lubricant entrained within the front drive assembly and the inertial loading of the front prop shaft which must be overcome by the "mode" shift synchronizer clutch unit. More specifically, the cold lubricant detrimentally effects the capability of the synchronizer clutch unit to develop adequate "index" torque required to overcome the front axle drag torque. As such, the front output components of the transfer case slow down following synchronization to produce relative movement between the clutch sleeve internal splines and the chain carrier sprocket splines. This relative movement causes the splines to "clash" causing the undesirable noise and shift effort.

SUMMARY OF THE INVENTION

It is therefore an object of the present invention to overcome the disadvantages associated with conventional four wheel drivetrains by providing a shift assist system for substantially reducing the gear clash and shift resistance encountered upon shifting into the four-wheel drive mode during cold weather conditions.

It is a further object of the present invention to provide a control system for selectively actuating the axle disconnect system for automatically coupling the non-driven wheels to its associated final drive mechanism upon synchronization for counteracting the inertial loading acting on the synchronizer clutch mechanism.

Accordingly, the present invention permits utilization of a conventional four-wheel drive transfer case which is interactively associated with an electronic control unit and sensor system for sensing the rotational speed of the front and rear prop shafts or transfer case output shafts and selectively actuating the axle disconnect system in response thereto.

More particularly, the cold shift assist system of the present invention utilizes first and second speed sensing devices for sensing the speed of first and second shafts, respectively. Signals generated by the first and second sensing devices are sent to an electronic control unit. During two-wheel operation, if the rotational speed of the two shafts is substantially equal (i.e., synchronous speed), the control unit selectively actuates the axle connecting mechanism for coupling the non-driven prop shaft to be rotatably driven upon rotation of the non-driven wheels. Thereafter, the vehicle operator can shift the transfer case into the four-wheel drive mode without experiencing gear clash or excessive shift resistance since relative rotational movement between the non-driven prop shaft and, in turn, the chain carrier and the synchronizer clutch sleeve splines have been eliminated.

It is another object of the present invention to provide an electronic control module adapted to process electrical input signals, and make controlled decisions in response thereto.

BRIEF DESCRIPTION OF THE DRAWINGS

Further objects, features and advantages of the present invention will be apparent from the following description and accompanying drawings in which.

DETAILED DESCRIPTION OF THE INVENTION

Figure 1:
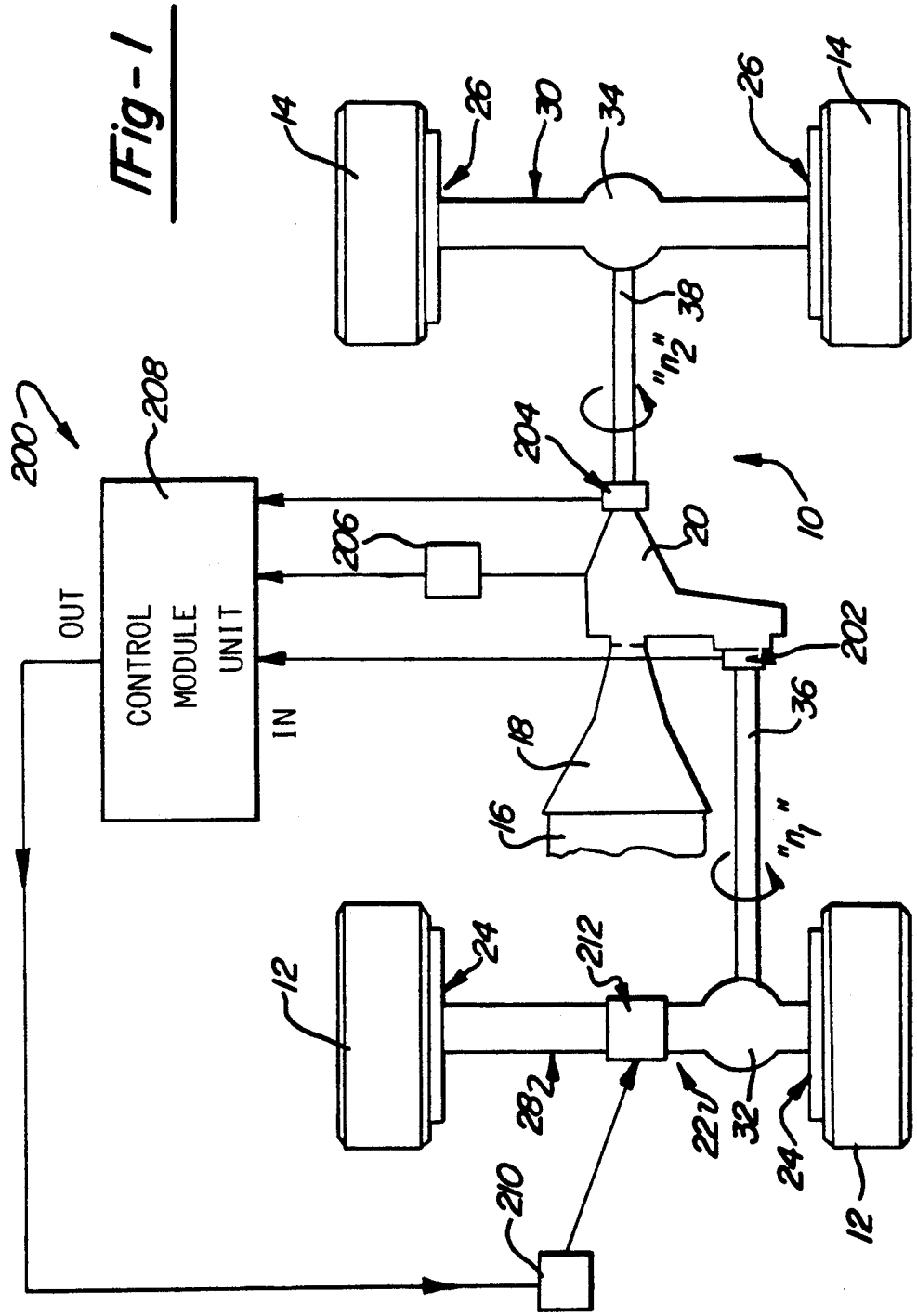
FIG. 1 is a schematic representation of a motor vehicle with a part-time four-wheel drivetrain equipped with the electronic shift assist system of the present invention.

Referring to FIG. 1, a vehicle of a type suited for use with the present invention is indicated generally by 10. Vehicle 10 has a pair of front wheels 12 and a pair of rear wheels 14 drivable from a source of power, such as an engine 16, through a transmission 18 which may be of either the manual or automatic type.

Figure 2:
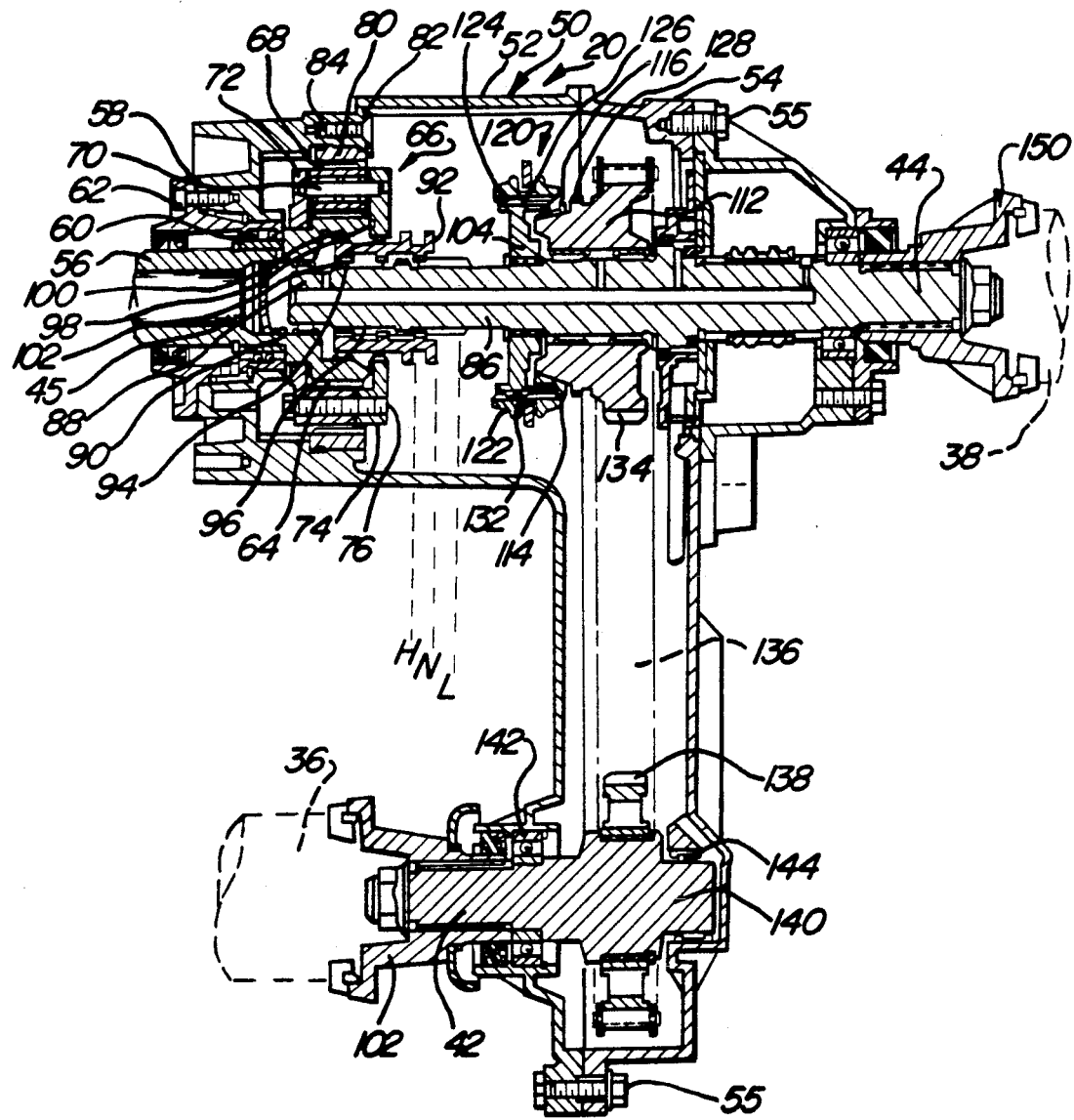
FIG. 2 is a cross-sectional view of an exemplary transfer case.

In the embodiment shown, vehicle 10 is a rear wheel drive vehicle which incorporates a transfer case 20 for receiving drive torque from transmission 18 for normally driving rear wheels 14 in a two-wheel drive mode of operation. Transfer case 20 also selectively transfers torque to front wheels 12 upon being coupled to a front drive mechanism 22 for defining a four-wheel drive mode of operation. As such, front wheels 12 are selectively driven through the cooperative action of front drive mechanism 22 and transfer case 20. Front and rear wheels 12 and 14 are part of front and rear wheel assemblies 24 and 26, respectively, which, in turn, are connected at opposite ends of front and rear axle assemblies 28 and 30, respectively. Front axle assembly 28 is part of front drive mechanism 22 which also includes a front differential 32 coupled to be driven by front prop shaft 36 when transfer case 20 is operating in the four-wheel drive mode. Rear axle assembly 30 includes a rear differential 34 coupled in driven relationship to rear prop shaft 38 for driving rear wheel assemblies 26. As seen in FIG. 2, prop shafts 36 and 38 are connected at their opposite ends to front and rear output shafts 42 and 44, respectively, of transfer case 20. A transmission output shaft 45 couples transmission 18 to transfer case 20 to supply power thereto.

FIG. 2 illustrates an exemplary transfer case 20 adapted for use with the present invention and which is shown and described in greater detail in U.S. Pat. No. 4,770,280 issued Sept. 13, 1988 to Frost, assigned to the assignee of the present invention, and the disclosure of which is expressly incorporated by reference herein. As such, the following is an abbreviated description of the various components pertinent to an understanding of the present invention. It is to be understood however, that most conventional four-wheel drive transfer cases can be used with the improved cold shift assist systems without departing from the fair scope of the present invention. Likewise, it is to be understood that the orientation of the drivetrain on vehicle 10 is merely exemplary in nature and that the drivetrain could be reversed for normally driving the front wheels in the two-wheel drive mode.

With reference to FIG. 2, transfer case 20 is shown to include a housing 50 formed by front and back half sections 52 and 54, respectively, suitably interconnected by a plurality of threaded bolts 55. Front half section 52 receives transmission output shaft 45 within an internally splined input stub shaft 56. Input stub shaft 56 is shown rotatably mounted in a collar portion 58 of front half section 52 by bearing assembly 60 with collar portion 58 secured by bolts 62 to housing front half section 52.

Input stub shaft 56 has an input sun gear 64 of a helical planetary gear set assembly 66, formed integral therewith. Sun gear 64 is shown meshed with a plurality of planet pinion gears 68. Each planet pinion gear 68 is rotatably journalled on a pin 70 supported in a planetary carrier. The planetary carrier includes fore and aft ring members 72 and 74, respectively, secured by bolts 76. Planet gears 68 mesh with a helical annulus gear 80 mounted via a splined press-fit to the inner surface of housing front section 52. Annulus gear 80 is additionally retained against rearward axial movement away from its stop shoulder by a plurality of radially disposed locking tabs 82 each fixed to front section 52 by machine screws 84.

An output shaft 86 is aligned on the longitudinal axis of input shaft 56 and has a pilot portion 88 journalled in input shaft axial bore 90. Output shaft 86 has a clutch collar 92 axially slidable thereon by means of collar internal splines 94 engaged with external splines 96 formed on output shaft 86. Collar 92 is formed with external clutch teeth 98 shown slidably engaged with internal clutch teeth 100 located in an axial counterbore in the right or aft end of input shaft 56. Torque or power flow is transferred directly from input shaft 56 through the engaged teeth 98 and 100 and the engaged collar splines 94 and output shaft splines 96, thereby establishing a direct high range position indicated by the construction line "H".

Carrier aft ring 74 includes internal spur gear teeth 102 formed concentric with collar 92. Aft ring internal teeth 102 are placed in sliding meshed engagement with the clutch collar external teeth 98 upon collar 92 being slid aft for defining a direct low drive range indicated by the construction line "L" position of collar 92. It will be noted that when collar 92 is moved a predetermined distance to the right from its high range position, its external teeth 98 are disengaged from internal clutch teeth 100 for engagement with carrier aft ring internal teeth 102 providing a neutral drive range position indicated by construction line "N". With transfer case 20 in neutral, planetary gear set 66 is free of engagement with any stationary transfer case gears. Therefore, the rotation of input stud shaft 56, which includes integral sun gear 64, drives only planetary pinion gears 68 and carrier fore 72 and aft 74 rings around annulus gear 80. Thus, in the neutral position no driving force is transmitted to output shaft 86, and thus no power to the vehicle rear wheels.

A hub member 104 is fixedly splined to output shaft 86 in a conventional manner. Hub 104 encircles a blocker ring 114 having radially extending external tooth 116 formed at its aft end. Hub member 104 is rotatably journalled on output shaft 86 by a synchronizer mechanism generally indicated at 120.

Synchronizer mechanism 120 is a conventional blocking synchronizer which can be a "strut-type" as shown and described in greater detail in the S.A.E. Technical Paper Series No. 680008 entitled "Manual Transmission Synchronizer" by Richard J. Socin and L. Kirk Walters. It is to be understood, however, that various other types of synchronizer mechanisms could be used without departing from the scope of the present invention. Another example of a synchronizer mechanism which could be used with the present invention is disclosed in U.S. Pat. No. 3,700,083 issued Oct. 29, 1972 to N. Ashikawa et al. and which is commonly referred to as a "strutless" synchronizer. Further, chain carrier 112 could be in the form of other gear means, such as a speed gear member journally mounted in a transmission speed shaft for example, without departing from the scope of the present invention.

Shiftable clutch sleeve 12 of synchronizer mechanism 120 is shown in a central disengaged or "neutral" position. Clutch sleeve 122 is formed with internal spline teeth 124 which are in constant axial sliding engagement with external spline teeth 126 formed on hub 104. Thus, synchronizer clutch sleeve 122 may be shifted to the right to its four-wheel drive mode "lockup" position wherein its internal spline teeth 124 drivingly engage external spline teeth 128 of chain carrier 112.

A thrust mechanism is provided for moving blocker ring 114 toward chain carrier 112 upon shifting clutch sleeve 122 to the right. In strut-type blocking synchronizers, the thrust mechanism includes either a compression spring or a pair of energizing circular retainer springs (not shown) that are compressed and inserted between a plurality of circumferentially spaced key-like struts. Each of the struts is biased outwardly in its respective longitudinally extending slot formed in the hub. The struts have a raised central "hump" portion which engages a corresponding detent groove formed in the clutch sleeve external spline teeth while clutch sleeve 122 is in the "neutral" position.

As seen in FIG. 2, chain carrier 112 includes a drive sprocket 134 drivingly engaging a chain, shown in dashed lines at 136, which is coupled to a lower driven sprocket 138. Driven sprocket 138, in turn, is coupled to a front output shaft 140. Shaft 140 is mounted for rotation within housing front half 52 by ball bearing assembly 142 and housing rear half 54 by roller bearing assembly 144. Transfer case front output shaft 140 is suitably connected by coupling 102 to the vehicle's front propeller driven shaft 36. Similarly, rear output shaft portion 44 of output shaft 86 is suitably connected by coupling 150 to rear prop shaft 38.

The shift sequence of synchronizer 120 is initiated upon clutch sleeve 122 being moved from its "neutral" position (FIG. 2) to a first detent position. In this first position a force, either manual or mechanical, is applied for starting movement of clutch sleeve 122 to the right. This force causes the clutch sleeve 122 to move axially out of the "neutral" position for taking up the running clearances between clutch sleeve 122 relative to blocker ring 114, and between blocker ring 114 relative to chain carrier external teeth 128.

Next, a detent load build-up occurs wherein blocker ring 114 and chain gear 112 are loaded. A third step occurs in the sequence when blocker ring 114 moves to its indexed position. This occurs because an axial cone torque force is also being applied. The cone torque loading is developed by the frictional loading between cooperating conical surfaces formed on blocker ring 114 and chain carrier 112. The cone torque loading causes the synchronizer clutch blocker ring 114 to rotate in a first direction to its indexed position.

As a fourth step, the chamfers of clutch sleeve internal spline teeth 124 contact the chamfers of blocker ring external teeth 116.

A fifth step consists of blocking ring 114 rotating or moving aside in the opposite direction for allowing clutch sleeve internal spline teeth 124 to pass. This opposite rotation of blocker ring 114 is achieved when the rotational speed of chain carrier 112 causes the cone torque to fall to zero. Synchronization is now complete and blocker ring 114 is no longer energized. As the index torque resulting from the chamfer-to-chamfer loading between clutch sleeve internal splines 124 and blocker ring external teeth 116 now exceeds the cone torque, blocker ring 114 is free to rotate in the opposite direction.

A sixth step occurs following synchronization wherein chain carrier 112 rotates aside to permit clutch sleeve internal splines teeth 124 to pass beyond blocker ring external teeth 116 a predetermined distance such that initial "locked" contact is made between clutch sleeve spline teeth 124 and chain carrier external spline teeth 128. An index torque is now built on the gear chamfers which acts to move chain carrier 112 aside such that clutch sleeve 122 passes through for completing the lockup.

It will be noted that following completion of synchronization, blocker ring 114 is unblocked and moves aside to pass clutch sleeve spline teeth 124 into initial locked contact. Heretobefore it has been critical that clutch sleeve 122 be quickly advanced rightward to its locked position wherein sleeve spline teeth 124 engage chain carrier external spline teeth 128. It has been demonstrated in driving tests that a momentary delay in the advancement of clutch sleeve 122 between steps five and six allows chain carrier 112 to resume nonsynchronous rotational movement relative to clutch sleeve 122. Any resumption of rotational movement by chain carrier 112 tends to interfere or interrupt the travel of clutch sleeve 122 by not allowing the chamfers of clutch sleeve spline teeth 124 to smoothly contact the opposed chamfers on chain carrier splines 128. As mentioned, such relative rotation is largely due to the high viscosity of the cold fluid in front differential 32 acting on chain carrier 112 through prop shaft 36 output shaft 140 and chain 136. Said another way, interruption or noise in the shifting sequence is caused by chain carrier spline teeth 128 rotating away from their aligned positions prior to sleeve spline teeth 124 passing therebetween to their initial locked mode position. The present invention is adapted to prevent such relative rotation and thereby promote smooth chamfer-to-chamfer contact following synchronization.

In accordance with the teachings of the present invention, an electronic shift assist system 200 is provided for substantially reducing the shift resistance encountered by the vehicle operator upon attempting to shift transfer case 20 into its four-wheel drive mode during cold weather condition. In particular, shift assist system 200 includes a first speed sensing device, generally identified as reference numeral 202, which is provided to measure the rotational speed "$n_1$" of front prop shaft 36 and generate a signal indicative thereof. Shift assist system 200 further includes a second speed sensing device 204 provided to measure the rotational speed "$n_2$" of rear prop shaft 38 and generate a signal indicative thereof. Any suitable speed sensing device capable of generating a signal respresentative of the rotational speed of a shaft is within the scope of the present invention. It will also be appreciated that the sensing deices can be alternatively adapted to sense the rotational speed of front and rear output shafts 140 and 146, respectively.

Transfer case switch 206 provides a signal indicating whether transfer case 20 is operating in its two-wheel drive mode or its four-wheel drive mode. An electronic control unit or module 208 is provided to receive the electrical input signals generated from first and second speed sensors 202 and 204, respectively, and transfer case switch 206. Control unit 208 has electronic circuit means for comparing signals "$n_1$" and "$n_2$".

According to the embodiment shown, actuation valve means, such as electrically actuated on-off solenoid valve 210, is provided for selectively actuating a front axle connect mechanism 212 which is provided for selectively coupling and decoupling front wheel assemblies 24 and front driven mechanism 22. Solenoid valve 210 controllably actuates axle connect mechanism 212 in response to an output signal generated by control unit 208.

Figure 3:
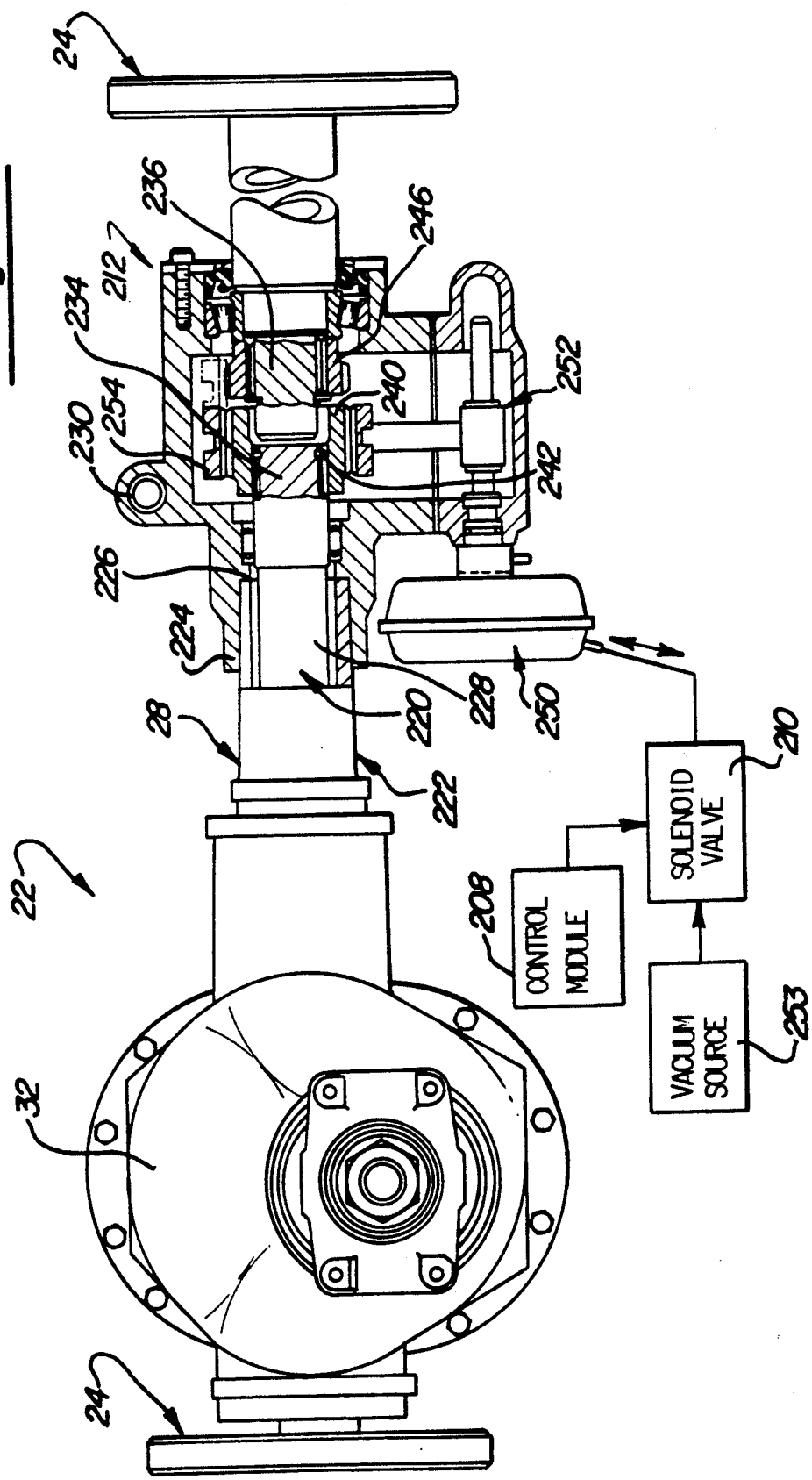
FIG. 3 is a side view, partially broken away, of a portion of a front drive assembly adapted for use in the present invention including the front axle disconnect mechanism.

Referring now to FIG. 3, there is shown a portion of an exemplary front drive mechanism 22 which is pertinent to the understanding of the operation of the present invention. However, it is to be understood that front drive mechanism 22 is merely illustrative in nature and is not intended to limit the present invention in any fashion. In general, front drive mechanism 22 includes front axle assembly 28, one or more front axle connect mechanisms 212 and front wheel assemblies 24. Front axle assembly 28 includes a shaft assembly 220 and a housing 222. Housing 222 includes a collar 224 which has an internal opening 226 that receives an axle tube 228. Housing 222 includes a mounting boss 230 for supporting the assembly to a relatively fixed member, for example, the engine block. Alternatively, it can also be practiced with "live" axle systems wherein the axle responds to movement of wheels 24 of vehicle 10. In such systems, housing 222 would be mounted to and form a part of the live axle.

Shaft assembly 220 has an inner shaft section 234 and an outer shaft section 236. Inner shaft section 234 is coupled to differential 32. Outer section 236 is physically separated from inner shaft section 234 and attached to wheel assembly 24 in a conventional manner. A gear 240 is mounted on the outermost end of inner shaft section 234 and secured thereto with an internal locking ring 242. Outer shaft section 236 also includes gear 246 mounted at its inner end.

Front drive mechanism 22 has a first operating (i.e., "uncoupled") mode typically associated with two-wheel drive operation of vehicle 10 wherein inner and outer shaft sections 234 and 236, respectively, are not coupled together, but rather are free to rotate independently of one another. In this first operating mode, front wheel assemblies 24 are not coupled to front differential 32. Front drive mechanism 22 also has a second operating mode (i.e., "coupled") wherein inner and outer sections 234 and 236, respectively, are coupled or locked together for co-rotation such that wheel assemblies 24 are coupled to transfer case 20 via differential 32 and prop shaft 36. Typically, this second mode of operation is associated with four-wheel drive operation of vehicle 10.

The exemplary automatic front axle connect mechanism 212 is shown to include a vacuum motor 250 and a shift fork assembly 252. Vacuum motor 250 is in fluid communication with a vacuum source 253 such as the vacuum from the intake manifold of engine 16. Preferably, solenoid valve 210 is a control valve for opening and closing a communication circuit between the vacuum source and vacuum motor 250. Therefore, shift fork assembly 252, under control of vacuum motor 250, controls the axial shifting of a clutch collar 254 between positions corresponding to the first "uncoupled" and second "coupled" operating modes of front drive mechanism 22. In the first operating mode, clutch collar 254 is, as shown, in engagement only with gear 240. In this position, shaft sections 234 and 236 are decoupled and differential 32 is disconnected from wheel assemblies 24. In the second operating mode, clutch collar 254 is shifted axially (rightward as indicated in phantom), to engage gears 240 and 246 to cause half-shaft sections 234 and 236 to rotate in common. In this position, differential 32 is capable of transmitting power through connected shaft sections 234 and 236 to wheel assemblies 24.

In general, control unit 208 generates an output signal for selectively actuating solenoid control valve 210 to shift vacuum motor shaft 250 to its extended position for causing corresponding shifting movement of clutch collar 256 to a position corresponding to the second operating or "coupled" state. More particularly, shift assist system 200 is operable under substantially synchronous speed conditions (i.e., $n_1 = n_2$) to selectively and automatically couple front prop shaft 36 and, in turn, output shaft 140 and chain carrier 112 for rotation with front wheel assemblies 24 prior to the vehicle operator completely shifting into the four-wheel drive mode.

Operation of cold assist system 200 will now be described in greater detail. Assuming transfer case switch 206 indicates that vehicle 10 is operating in its two-wheel drive mode and speed sensors 202 and 204 indicate that synchronizer 120 has caused front and rear prop shafts 36 and 38, respectively, to be rotating at substantially synchronous speed, then control unit 208 compares "$n_1$" and "$n_2$" and generates an output signal to selectively actuate solenoid valve 62 for automatically coupling front wheel assemblies 24 to front differential 32 via axle connect mechanism 212. Such actuation of axle connect mechanism 212 is accomplished immediately upon completion of synchronization. Since, front prop shaft 36 is interconnected to front differential 32, it rotates with front wheels 12 despite no drive torque being applied thereto from transfer case 20 until the operator completes the lock-up shift. As such, chain carrier 112 is prohibited from resuming a different rotational speed relative to clutch sleeve 122.

Thereafter, when the vehicle operator attempts to complete the manual shift of transfer case 20 into the four-wheel drive mode, the effects of inertial loading associated with front prop shaft 36 and the cold fluid or lubricant are negated due to previous actuation of axle connect mechanism 212 upon synchronous rotation of prop shafts 36 and 38.

The system is adapted to maintain the coupled interconnection between front differential 32 and front wheel assemblies 24 until transfer case switch 206 signals control unit 208 that the vehicle operator has shifted out of four-wheel drive. Therefore, control unit 208 generates an output signal for actuating solenoid value 210 for decoupling front drive mechanism 22 from front wheel assemblies 24.

The foregoing discussion discloses and describes merely an exemplary embodiment of the present invention. One skilled in the art will readily recognize from such discussion, and from the accompanying drawings and claims, that various changes, modifications and variations can be made therein without departing from the spirit and scope of the invention as defined in the following claims. In particular, the described front axle assembly, axle connect system and transfer case were merely exemplary in nature and are not to be interpreted to limit the scope of the present invention.

What is claimed is:

1. A manual shift assist system for a motor vehicle having a source of power for generating drive torque, said shift assist system comprising:

first drive means for interconnecting a first set of wheels;

second drive means for interconnecting a second set of wheels;

power transfer means coupled to said source of power for normally transferring said drive torque to said first drive means to define a two-wheel drive mode of operation, said power transfer means further adapted to permit a vehicle operator to selectively transfer drive torque to said second drive means to define a four-wheel drive mode of operation;

first shaft means interconnecting said power transfer means to said first drive means;

second shaft means interconnecting said power transfer means to said second drive means;

axle connecting means operable for selectively coupling and decoupling said second set of wheels with said second drive means;

first speed sensor means for sensing the rotational speed of said first shaft means and generating a first signal indicative thereof;

second speed sensor means for sensing the rotational speed of said second shaft means and generating a second signal indicative thereof; and control means for selectively actuating said axle connecting means in response to said first and second signals for normally decoupling said second set of wheels from said second drive means upon said power transfer means being shifted out of said four-wheel drive mode, said control means further adapted to actuate said axle connecting means for selectively coupling said second set of wheels to said second drive means while said power transfer means is operating in said two-wheel drive mode when the rotational speed of said second shaft means is substantially equal to the rotational speed of said first shaft means, said selective coupling acting to inhibit relative rotational movement for reducing resistance to said vehicle operator thereafter shifting said power transfer means into said four-wheel drive mode.

2. The shift assist system of claim 1 wherein said power transfer means includes speed synchronization means for generating synchronous rotation of said first and second shaft means prior to permitting said vehicle operator to completely shift into said four-wheel drive mode.

3. The shift assist system of claim 1 wherein said control means includes an electronic control unit adapted to receive said first and second signals and for generating an output signal in response thereto, and valve means operable for selectively actuating said axle connecting means in response to said output signal.

4. The shift assist system of claim 3 wherein said electronic control unit includes circuit means for comparing said second signal to said first signal to determine when said rotational speed of said second shaft means equals said first shaft means.

5. The shift assist system of claim 3 wherein said second drive means includes an axle assembly having a differential, a first shaft section coupled to one of said second set of wheels and a second shaft section coupled to said differential, said axle connecting means including clutch means operably associated with said first and second shaft sections and shiftable between first and second positions to respectively couple or decouple said shaft sections, said clutch means being movable by said valve means in response to said output signal.

6. The shift assist system of claim 1 wherein said first drive means comprises a rear axle assembly such that said vehicle is normally a rear wheel drive vehicle.

7. The shift assist system of claim 1 wherein said first and second shaft means are front and rear prop shafts rotatably connected to front and rear outputs of said power transfer means, and wherein said first and second speed sensor means are speed sensing devices associated with said front and rear prop shafts which are adapted to measure their respective rotational speeds.

8. A method for reducing shift effort upon a motor vehicle operator selectively shifting from a two-wheel drive to a four-wheel drive mode of operation during cold weather conditions, the motor vehicle having a drivetrain including a source of power, a speed gear transmission driven by said source of power, and a transfer case for receiving application of drive torque from said transmission for normally driving a first set of wheels in the two-wheel drive mode of operation, said transfer case adapted to selectively transfer drive torque to a second set of wheels upon being selectively coupled therewith for providing the four-wheel drive mode of operation, said method comprising the steps of:

connecting a first drive mechanism between said transfer case and said first set of wheels, said first drive mechanism including a first differential, a first prop shaft interconnecting said first differential to said transfer case, and axle connecting means for selectively coupling said first set of wheels to said first differential;

connecting a second drive mechanism between said transfer case and said second set of wheels, said second drive mechanism including a second differential interconnecting to said second set of wheels and a second prop shaft interconnecting said second differential to said transfer case;

sensing the rotational speed of said first prop shaft and generating a first signal indicative thereof;

sensing the rotational speed of said second prop shaft generating a second signal indicative thereof;

synchronizing the rotational speed of said first and second prop shafts;

selectively actuating said axle connecting means for coupling said first set of wheels to said first drive mechanism upon synchronization of said first and second prop shafts for reducing resistance to subsequent completion of the vehicle operator shifting said transfer case into said four-wheel drive mode; and selectively actuating said axle connecting means for decoupling said first set of wheels from said first drive mechanism when the vehicle operator shifts said transfer case into said two-wheel drive mode.

9. In a vehicle having a first set of wheels and a second set of wheels adapted to be driven from a source of power, a cold shift assist system comprising:

transfer case means for receiving application of drive torque from said source of power and selectively transferring said drive torque to said first set of wheels upon selective coupling therewith, and normally transferring said drive torque to said second set of wheels by a normal coupling therewith;

first drive means interconnecting said transfer case means to said first set of wheels;

axle connecting means for selectively coupling said first set of wheels for cooperative engagement with said first drive means;

second drive means interconnecting said transfer case means to said second set of wheels;

synchronizer clutch means associated with said transfer case means for generating synchronous rotation of said first and second drive means for permitting selective coupling of said transfer case means to said first set of wheels;

switch means for sensing whether said transfer case means is operating in a two-wheel drive mode or a four-wheel drive mode and generating a first signal indicative thereof;

first speed sensor means for sensing the rotational speed of said first drive means and generating a second signal indicative thereof;

second speed sensor means for sensing the rotational speed of said second drive means and generating a third signal indicative thereof;

control means for receiving said first, second and third signals and for generating an output signal in response thereto; and actuation means for selectively actuating said axle connecting means in response to said output signal for coupling said first set of wheels to said first drive means immediately upon said synchronizer clutch means causing synchronous rotation thereby reducing resistance to subsequent shifting of said transfer case means into said four-wheel drive mode, said actuation means selectively actuating said axle connecting means for decoupling said first set of wheels from said first drive means when said vehicle operator selectively shifts said transfer case means from said four-wheel drive mode into said two-wheel drive mode.

10. The cold shift assist system of claim 9 wherein said control means includes an electronic control unit adapted to receive said first, second and third signals and for generating an output in response thereto, and said actuation means is a control valve provided for selectively actuating said axle connecting means in response to said output signal.

11. The cold shift assist system of claim 10 wherein said electronic control unit includes circuit means for comparing said second signal to said third signal to determine if said first and second drive means are rotating in a substantially synchronous speed relationship.

12. The cold shift assist system of claim 9 wherein said first drive means includes a first axle assembly having a first shaft section coupled to one of said first set of wheels and a second shaft section coupled to a first differential unit provided for generating differential action between said first set of wheels, said axle connecting means including movable clutch means associated with said first and second shaft sections, said actuation means adapted to cause said clutch means to move between first and second positions to respectively couple or decouple said shaft sections.

13. The cold shift assist system of claim 9 wherein said second drive means comprises a rear axle assembly such that the vehicle is normally a rear wheel drive vehicle.

* * * * *